United States Patent [19]
Lee

[11] Patent Number: 6,034,836
[45] Date of Patent: Mar. 7, 2000

[54] METHOD FOR COMPENSATING FOR TRACK SHIFT DURING SERVO CONTROL OF A MAGNETO RESISTIVE HEAD

[75] Inventor: Hae-Jung Lee, Kyungki-do, Rep. of Korea

[73] Assignee: Samsung Electronics Co., Ltd., Suwan, Rep. of Korea

[21] Appl. No.: 08/963,518

[22] Filed: Nov. 3, 1997

[30] Foreign Application Priority Data

Nov. 1, 1996 [KR] Rep. of Korea ................. 96-51602

[51] Int. Cl.[7] ............................................ G11B 5/596
[52] U.S. Cl. ................................. 360/77.08; 360/75
[58] Field of Search .......................... 360/77.08, 75, 360/77.04, 77.02, 48, 77.05

[56] References Cited

U.S. PATENT DOCUMENTS

| | | |
|---|---|---|
| 4,402,023 | 8/1983 | Hiraguri . |
| 4,700,244 | 10/1987 | Fasen et al. . |
| 4,965,782 | 10/1990 | Mathews . |
| 4,974,109 | 11/1990 | Hoshimi et al. . |
| 5,073,833 | 12/1991 | Best et al. ............................ 360/77.08 |
| 5,079,663 | 1/1992 | Ju et al. . |
| 5,212,603 | 5/1993 | Hasegawa . |
| 5,335,127 | 8/1994 | Nagata et al. . |
| 5,343,341 | 8/1994 | Jahren . |
| 5,453,887 | 9/1995 | Negishi et al. . |
| 5,455,724 | 10/1995 | Suzuki et al. . |
| 5,457,587 | 10/1995 | Suzuki . |
| 5,461,517 | 10/1995 | Suda et al. . |
| 5,594,602 | 1/1997 | Isaka et al. . |
| 5,596,463 | 1/1997 | Hashimoto ....................... 360/77.04 X |
| 5,668,686 | 9/1997 | Shouji et al. . |
| 5,786,957 | 7/1998 | Inoue et al. .......................... 360/77.08 |
| 5,867,343 | 2/1999 | Le et al. .............................. 360/77.08 |
| 5,892,634 | 4/1999 | Ito et al. .............................. 360/77.08 |
| 5,953,178 | 9/1999 | Takatsuka et al. ............... 360/77.07 X |

*Primary Examiner*—Aristotelis M. Psitos
*Assistant Examiner*—James L Habermehl
*Attorney, Agent, or Firm*—Robert E. Bushnell, Esq.

[57] ABSTRACT

A servo burst recording and servo control method for a magnetic storage device having a magneto resistive (MR) head comprises the steps of recording an additional burst signal having a magnitude as large as the quantity of track shift caused by a displacement angle of the MR head around each center line of each track, and using the additional burst signal as position identification information for the MR head during servo control thereof. The additional burst signal can be used during a read operation only or during a write operation only.

23 Claims, 6 Drawing Sheets

METHOD FOR COMPENSATING FOR TRACK SHIFT DURING SERVO CONTROL OF A MAGNETO RESISTIVE HEAD

CLAIM OF PRIORITY

This application makes reference to, incorporates the same herein, and claims all benefits accruing under 35 U.S.C. § 119 from an application for CIRCUITFOR ELIMINATINGEXTERNAL INTERFERENCE SIGNALS AND METHOD FOR COMPENSATING FOR THE TRACK SHIFT earlier filed in the Korean Industrial Property Office on the Nov. 1, 1996 and there duly assigned Serial No. 51602/1996.

BACKGROUND OF THE INVENTION

1. Technical Field

The present invention relates to servo control of a magnetic storage device having a magneto resistive head (hereinafter referred to as an "MR head"), and more particularly to a servo burst recording and servo control method for compensating for track shift resulting from the structural properties of the MR head.

2. Related Art

The hard disk drives widely employed as auxiliary storage devices for computer systems have been rapidly and greatly improved in terms of the I/O data processing speed and the data storage capacity. Above all, the development of the MR head serves as an epoch-making step toward high-capacity and high-speed storage devices. Unlike the conventional magnetic inductance heads, the MR head, one of the highly competitive objects of research and development, is hardly affected by disk rotation speed, i.e., the time rate of the magnetic flux change. Therefore, it is an advantage that the magnetic flux change density, i.e., the FCPI (flux change per inch), can be greatly improved, but, on the contrary, it is a drawback that, due to the structural problem of the magneto resistive head, the track density, i.e., TPI (Tracks per Inch), has to be set lower than in the case of the conventional thin film head.

As explained in more detail below, when a conventional MR head is employed, a track shift phenomenon often occurs. The degree of such track shift is often such as to cause problems in utilization of the conventional MR head. Specifically, data transmitted from a host computer cannot normally be written on a desired track due to the track shift phenomenon.

In the prior art, a technique for compensating for track shift is employed. However, the technique of the prior art is ineffective in that, although the amount of track shift can be reduced by one-half, track shift still exists in the positive and negative directions. Thus, there is a need in the prior art for development of a more effective technique for compensating for track shift.

The following U.S. patents are representative of prior art relative to the invention disclosed herein, but are burdened by the disadvantages discussed herein: U.S. Pat. No. 5,668,686 to Shouji et al., entitled Magneto-Resistive Reading Head With Reduced Side-Lobe, U.S. Pat. No. 5,596,463 to Hashimoto, entitled Recording/Reproduction Apparatus With An Integrated Inductive Write, Magnetoresistive Read Head, U.S. Pat. No. 5,594,602 to Isaka et al., entitled Tracking Error Detecting Circuit, U.S. Pat. No. 5,461,517 to Suda et al., entitled Magneto-Resistance Effect Type Of Recording/Reproducing Head, U.S. Pat. No. 5,457,587 to Suzuki, entitled Method And System For Correcting Offset Of Head Position Signal, U.S. Pat. No. 5,455,724 to Suzuki et al., entitled Method Of Compensating Offtrack In Disk Unit, U.S. Pat. No. 5,453,887 to Negishi et al., entitled Head Tracking Servo Pattern, U.S. Pat. No. 5,343,341 to Jahren, entitled Method For Seeking The Center Of A Recorded Data Track, U.S. Pat. No. 5,335,127 to Nagata et al., entitled Lamination Type Magneto-Resistive Head, U.S. Pat. No. 5,212,603 to Hasegawa, entitled Tracking Control Means For A Multi-Channel Reproducing Apparatus, U.S. Pat. No. 5,079,663 to Ju et al., entitled Magnetoresistive Sensor With Track Following Capability, U.S. Pat. No. 4,974,109 to Hohimi et al., entitled Hard Disk Drive Employing A Reference Track To Compensate For Tracking Error, U.S. Pat. No. 4,965,782 to Mathews, entitled Off-Track Bit Shift Compensation Apparatus, U.S. Pat. No. 4,700,244 to Fasen et al., entitled Process And system For Compensating For Information Shifts On Disc Storage Media, and U.S. Pat. No. 4,402,023 to Hiraguri, entitled Tracking Control System In A Magnetic Recording And/Or Reproducing Apparatus.

SUMMARY OF THE INVENTION

Accordingly, it is an object of the present invention to provide a servo burst recording and servo control method capable of compensating for track shift resulting from the structural properties of the MR head in the magnetic storage device having an MR head.

It is another object of the present invention to provide a servo control method for controlling the magnetic storage device which uses the servo disk as the data recording medium, wherein the above servo disk contains the servo write pattern for compensating for track shift resulting from the structural properties of the MR head.

According to the present invention, there is provided a servo burst recording and servo control method for a magnetic storage device having a magneto resistive head (MR head), which method comprises the steps of recording an additional burst signal having a magnitude as large as the quantity of the track shift caused by the displacement angle of the MR head around each center line of each track, and using the additional burst signal as position ID information for the MR head during servo control.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
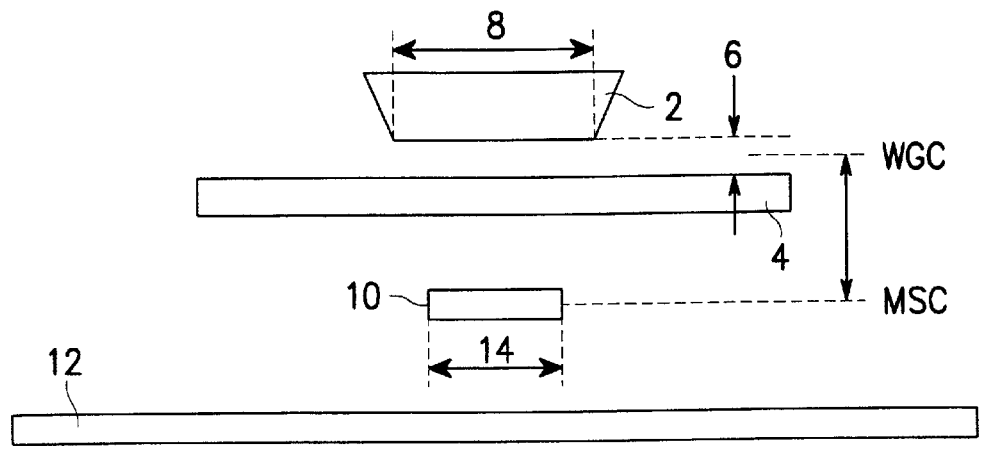
FIG. 1 is a descriptive diagram illustrating the general structure of the magneto resistive head.

Referring to FIG. 1, illustrating the structure of the conventional MR head, the MR head consists usually of a write pole of the thin film head for magnetic recording and a shield. The upper write pole 2 serves as a shield for MR sensor layer 10 and has a lower write pole 4, a write gap 6, and a write gap width 8. The MR sensor layer 10 is protected by the lower write pole 4 and the lower shield 12, and has a read sensor width 14 which is narrower than the write gap width 8. In the above structure, the write gap center (hereinafter referred to as "WGC") and the MR sensor layer center (hereinafter referred to as "MSC") are set apart at a specified interval l, whereby a track shift phenomenon is presented due to the interval l between the above centers when reading and writing.

Figure 2:
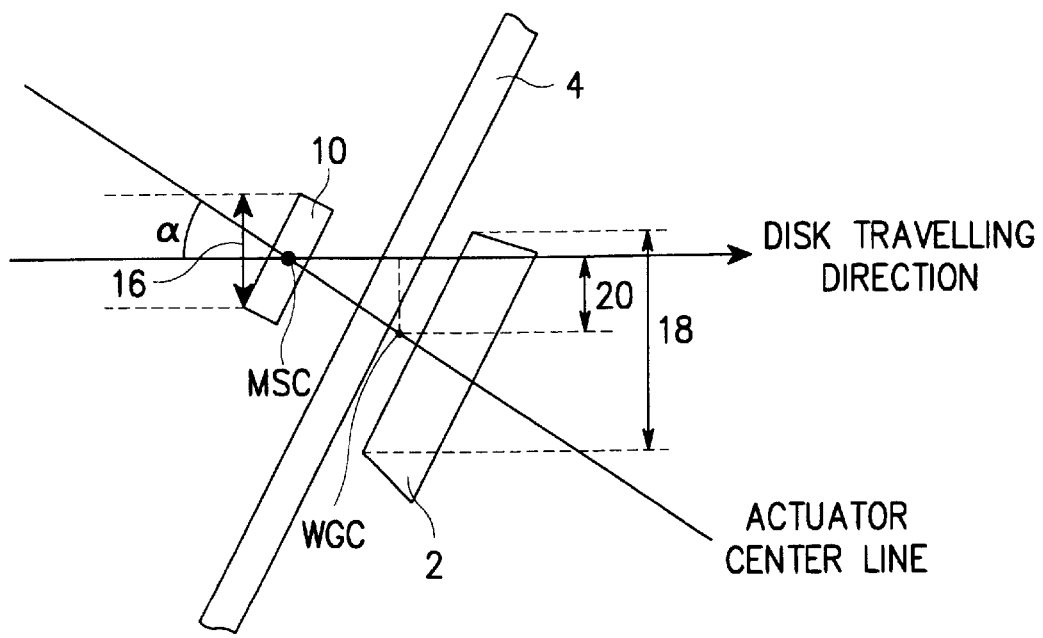
FIG. 2 is an explanatory diagram representing the quantity of track shift when the magneto resistive head has a displacement angle.

Referring to FIG. 2 illustrating the quantity of track shift when an MR head presents a displacement angle, the center line of the actuator and the traveling direction of the disk form together a displacement angle α. Accordingly, the MR head positioned on the center line of the actuator makes the same displacement angle α. Therefore, the valid write track width 18 and the valid read track width 16 are each equal to the corresponding values calculated by multiplying the respective widths 8 and 14 of the write pole 2 and the MR sensor layer 10, respectively, by the value of cosine α. Besides, the centers of both of the above valid write track widths 16, 18 do not coincide with each other, the difference 20 being calculated by multiplying the interval l between the WGC and the MSC by the value of sine α. Thus, the quantity of track shift resulting from the structural property of the MR head is obtained. Now, assuming that the MR head is positioned on the specified track in practice, the problems resulting from the quantity of the above track shift are described in detail in the following.

Figure 3:
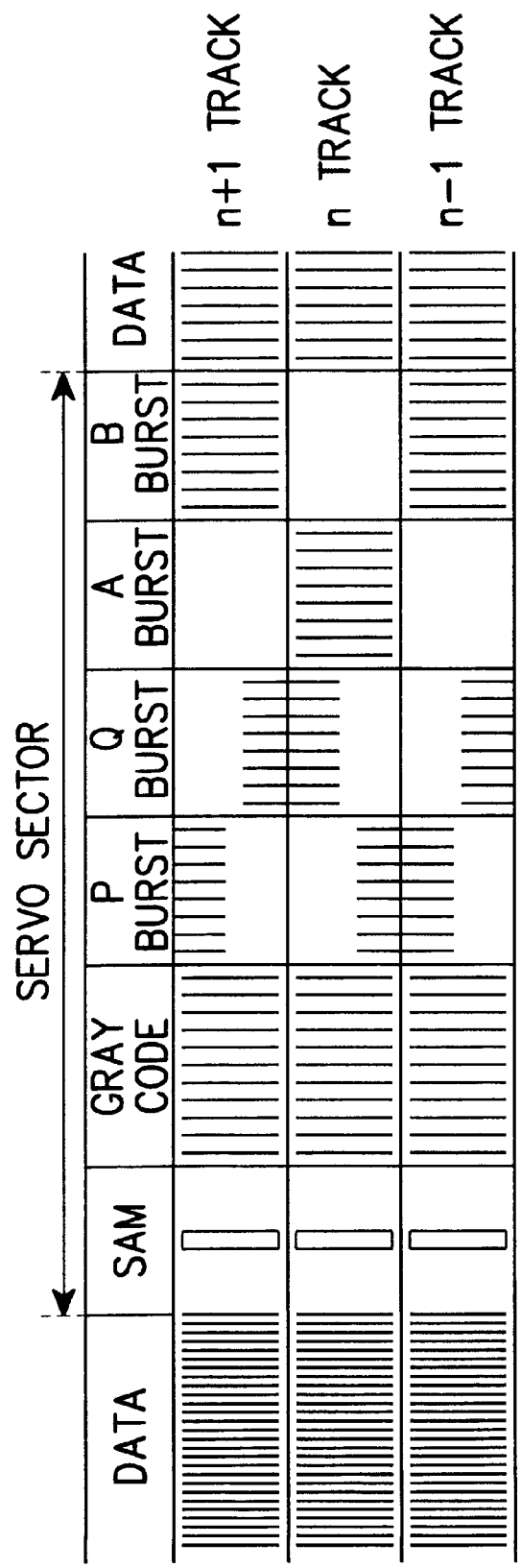
FIG. 3 is a conventional servo sector format chart containing four servo burst write patterns.

Referring to FIG. 3, illustrating a format diagram of the servo sector having four servo burst write patterns on the usual disk, each of the tracks arranged concentrically on the disk is divided into servo and data sectors. Each servo sector is further subdivided into a servo address mark (SAM) region used as a reference signal for servo related timing, a gray code region storing track ID information, and a burst region for controlling the head position. Four burst signals (P, Q, A, B) are usually recorded in the above burst region, in which the P, Q burst signals are recorded in half value between adjacent tracks, and are used as location ID information for the on-track control of the MR head during track following, while the A, B burst signals are used as odd- and even-numbered track ID information during tracking.

Figure 4:
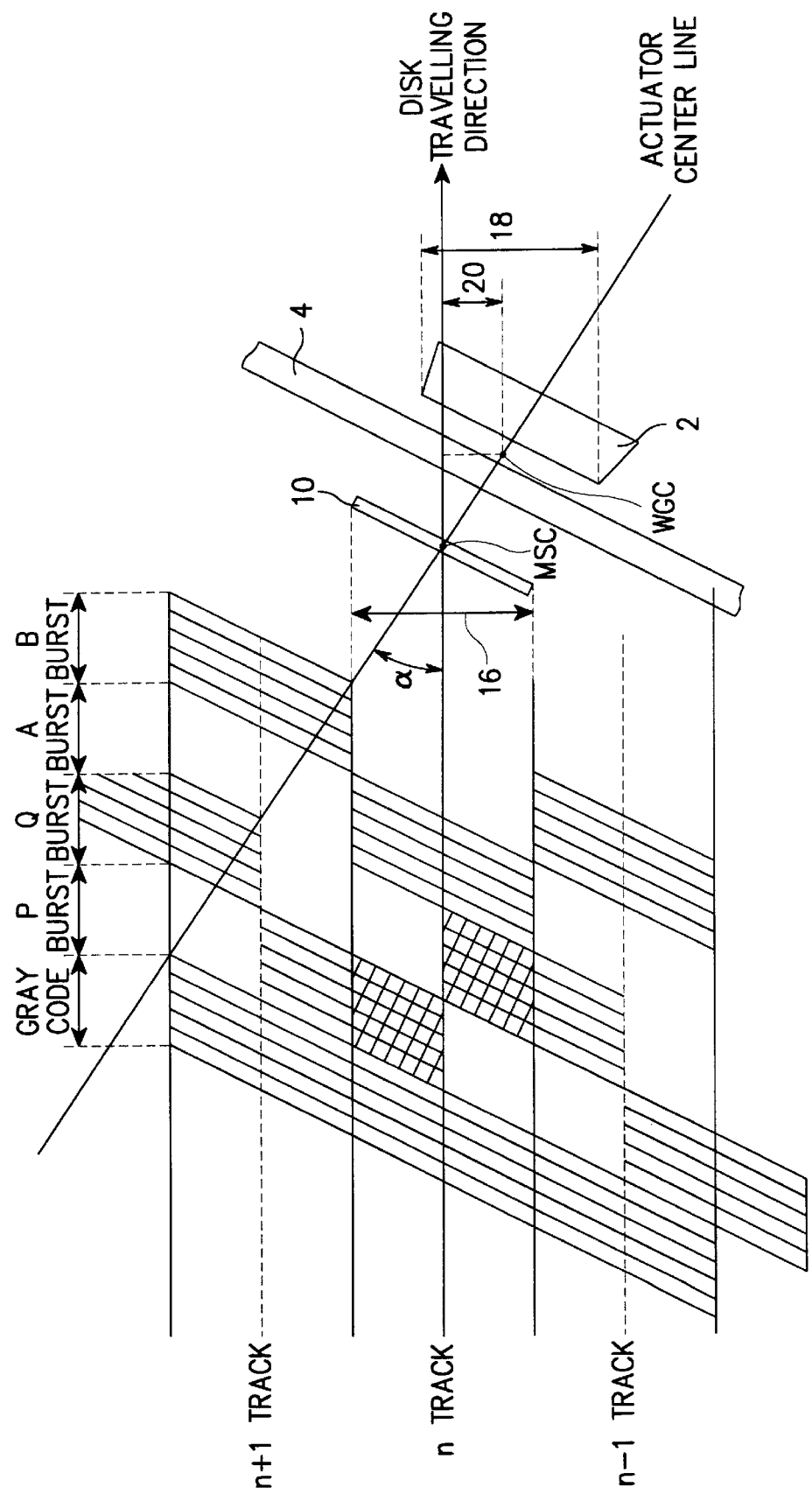
FIG. 4 is an explanatory diagram illustrating the quantity of track shift when the MR head performs a data writing operation on a disk sector storing four burst signals in the position having a displacement angle α.

Referring to FIG. 4, illustrating the quantity of track shift when the MR head performs a data writing operation on the disk sector storing four burst signals in the position having a displacement angle α, when writing the data received from the host computer on the specific track (nth track), the P, Q burst signals must be first read for the on-track control of the MR head. When the servo control unit (not shown) reads P, Q burst signals and controls the MR head so that it is positioned on the center line of the nth track, then the MR sensor layer 10 is positioned on the center line of nth track, as shown in FIG. 4. At this time, the MSC of the MR sensor layer 10 is positioned on the center line of nth track, and the center (i.e., WGC) of the valid write track width 18 is shifted by a width 20 equal to l sin α. Accordingly, the data transmitted from the host computer cannot be normally written on the object track (nth track).

The prior art technique for compensating for the above quantity of track shift is as follows: firstly, the most widely used method is that the MR sensor layer 10 is shifted in advance by l sin a sinq in consideration of the displacement angle α formed between the center line of the actuator and the disk traveling direction when manufacturing the MR heads; secondly, another method is that the actuator pivot is positioned in such a fashion that the absolute values of the positive and negative displacement angles can be identical with each other when determining the structural positions of the hard disk drive, and can minimize the displacement values to reduce the quantity of track shift. Actually, the above prior alt technique can reduce, to some extent, the quantity of track shift resulting from the structural properties of the MR head, but they encounter the limitation of TPI due to the same structural problems. For example, assuming that the displacement angle of a certain hard disk drive has a range of 0–20 degrees, and the distance between MSC and WGC is "l", the max. track shift is 0.342 l calculated from l sin (20°). In this case, when the above second method is employed to reduce the quantity of track shift, the quantity of track shift is l sin (−10°)–l sin (10°), and thus the range of the track shift is from −0.174 l to 0.174 l. Although the prior art can reduce the quantity of track shift by half, it is still an unsolved problem that the track shift exists in positive and negative directions.

Figure 5:
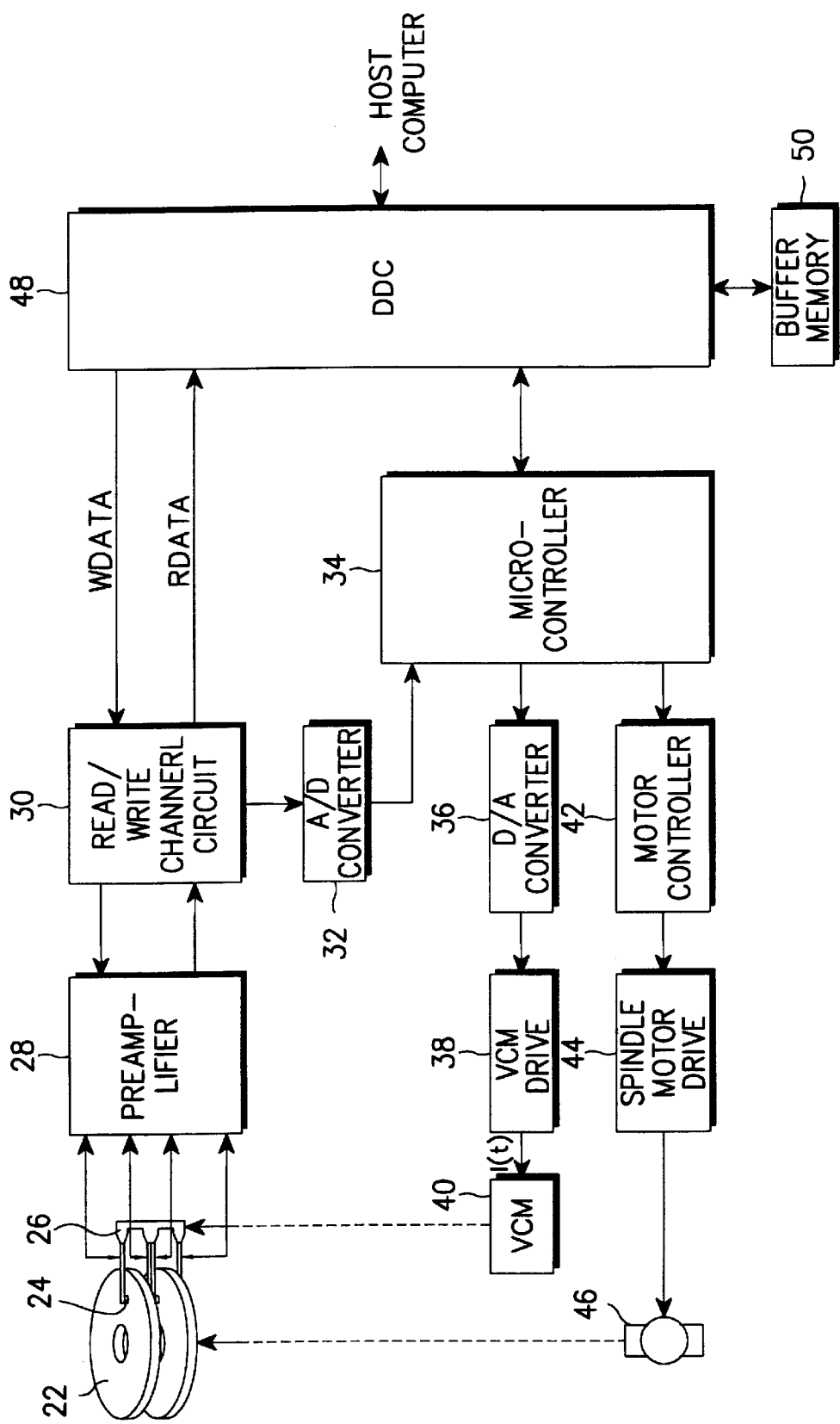
FIG. 5 is a block diagram of a magnetic storage device, i.e., a hard disk drive.

Referring to FIG. 5, illustrating a hard the disk drive consisting of two disks 22 and corresponding four heads 24, the disks 22 are usually stacked so as to be mounted on the drive shaft of a spindle motor 46, and each of disk surfaces has a corresponding head 24. The heads 24 are each positioned above the respective disk surfaces, and each is mounted on a corresponding arm extending from the arm assembly 26 of the rotary voice coil motor (VCM) 40.

When reading data from the disks, the preamplifier 28 amplifies the read signals picked up by a selected one of the heads 24 and applies the amplified signals to the read/write channel circuit 30. When writing data onto the disks 22, the preamplifier 28 activates the corresponding one of the heads 24 to write the encoded write data applied by/from the read/write channel circuit 30 onto the respective disks 22, whereby the preamplifier 28 selects one of the heads 24 under the control of the disk data controller (DDC) 48.

The read/write channel circuit 30 decodes the read signal applied by/from the preamplifier 28 to produce the read data RDATA, and encodes the write data WDATA applied by/from the DDC 48 for application to the preamplifier 28. Also the read/write channel circuit 30 demodulates the head positioning information, a part of the servo information, recorded on the disks 22 to produce the position error signal (PES), which is then applied to the A/D converter 32, whereby the A/D converter 32 converts the PES into a digital level value corresponding to the PES level so as to apply the digital value to the microcontroller 34.

The DDC 48 writes the data received from the host computer on the disks 22 through the read/write channel circuit 30 and the preamplifier 28, and/or transmits the data retrieved from the disks 22 to the host computer. Also, the DDC 48 interfaces communications between the host computer and the microcontroller 34.

The microcontroller 34 controls the DDC 48 in response to the read/write instructions received from the host computer, and further controls the track seeking and following operations, whereby the microcontroller 34 controls the track following operations by means of the PES value applied by/from the A/D converter 32, and performs servo control in response to the various servo related signals produced by/from a gate array (not shown).

The D/A converter 36 converts the control signal produced by/from the microcontroller 34 into an analog signal so as to control the positions of the heads 24.

The VCM driver 38 generates an actuator driving current I(t) in response to the signal applied by/from the D/A converter 36 and applies that current to the VCM 40 in order to drive the actuator. The VCM 40 moves the heads 24 horizontally on/above the disks 22 in response to the level and polarity of the current received from the VCM driver 38.

The motor controller 42 controls the spindle motor driver 44 according to a control value generated by the microcontroller 34 for controlling the rotation of the disks 22. The spindle motor driver 44 activates the spindle motor 46, and thus rotates the disks 22 under the control of the motor controller 42. The buffer memory 50 connected to the disk data controller (DDC) 48 temporarily stores data exchanged between the host computer and the disks 22 under the control of the disk data controller (DDC) 48.

Figure 6:
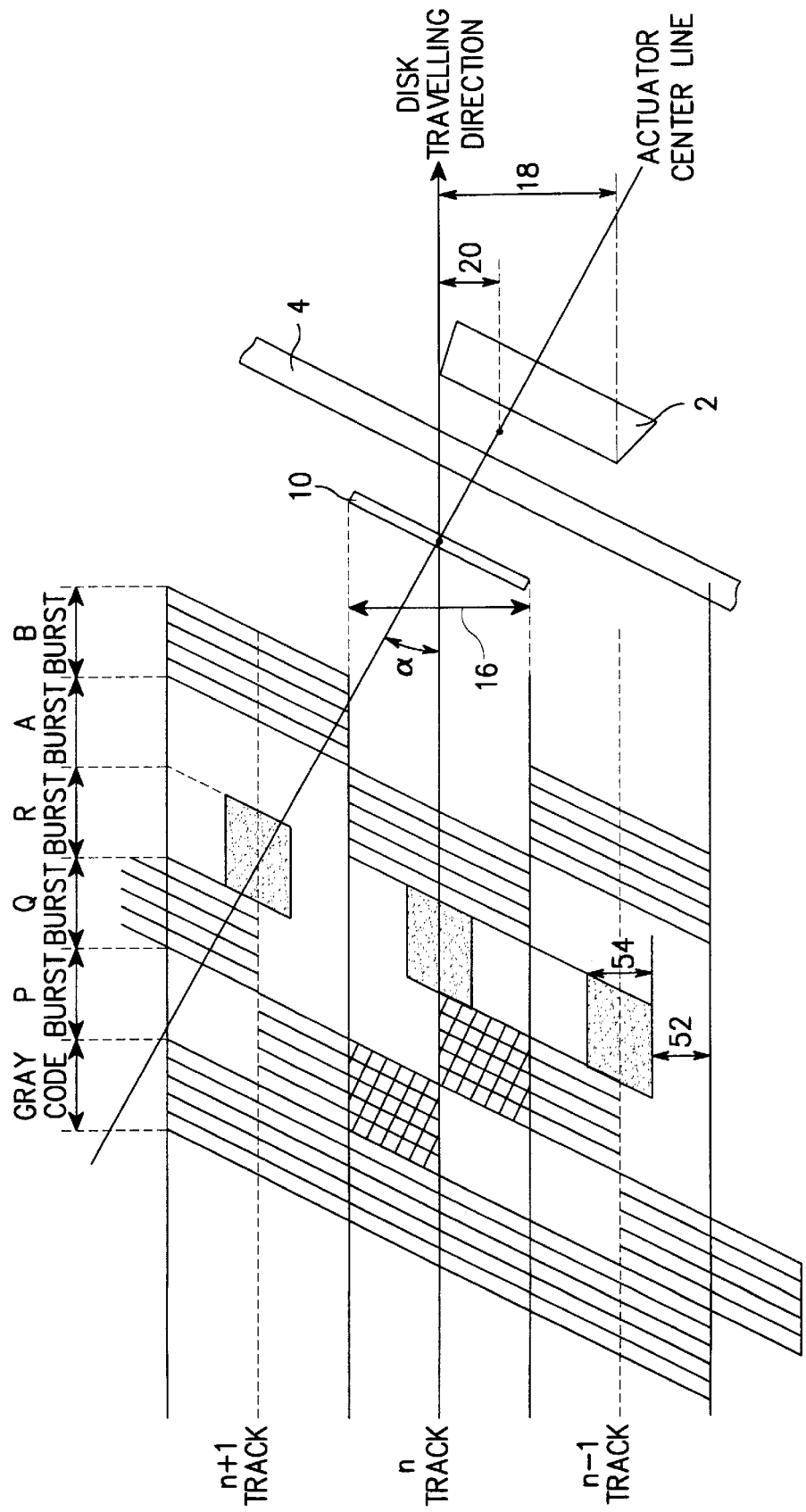
FIG. 6 is an explanatory diagram illustrating the servo burst write pattern recording five servo burst signals and the position of the MR head when reading data from the nth track according to an embodiment of the present invention.

Referring to FIG. 6, illustrating the servo burst write pattern recording five servo burst signals and the position of the MR head when reading data from the nth track, the servo burst write pattern further includes an R burst signal, in addition to the conventional four burst signals (P, Q, A, B). In accordance with the present invention, the R burst signal is written (positioned) after the Q burst signal which is used as the position ID information of the MR head. The R burst signal is recorded in the same magnitude 54 as that of the track shift 20 caused by the displacement angle of the MR head, centering around the track center line.

More specifically, the R burst signal is recorded at a point displaced from the boundary between the adjacent tracks by the quantity of the track shift 20, so that the quantity(l sin α) of the track shift 20, the magnitude 54 of the R burst signal, and the distance 52 from the track boundary to the R burst signal all have the same value, all being identical with each other. When reading data from the nth track, the microcontroller 34 controls the MR head on track by the conventional method, i.e., by means of the retrieved values from the P and Q burst signals. In other words, when reading data, the R burst signal (which is additionally provided according to an embodiment of the present invention) is not used.

Figure 7:
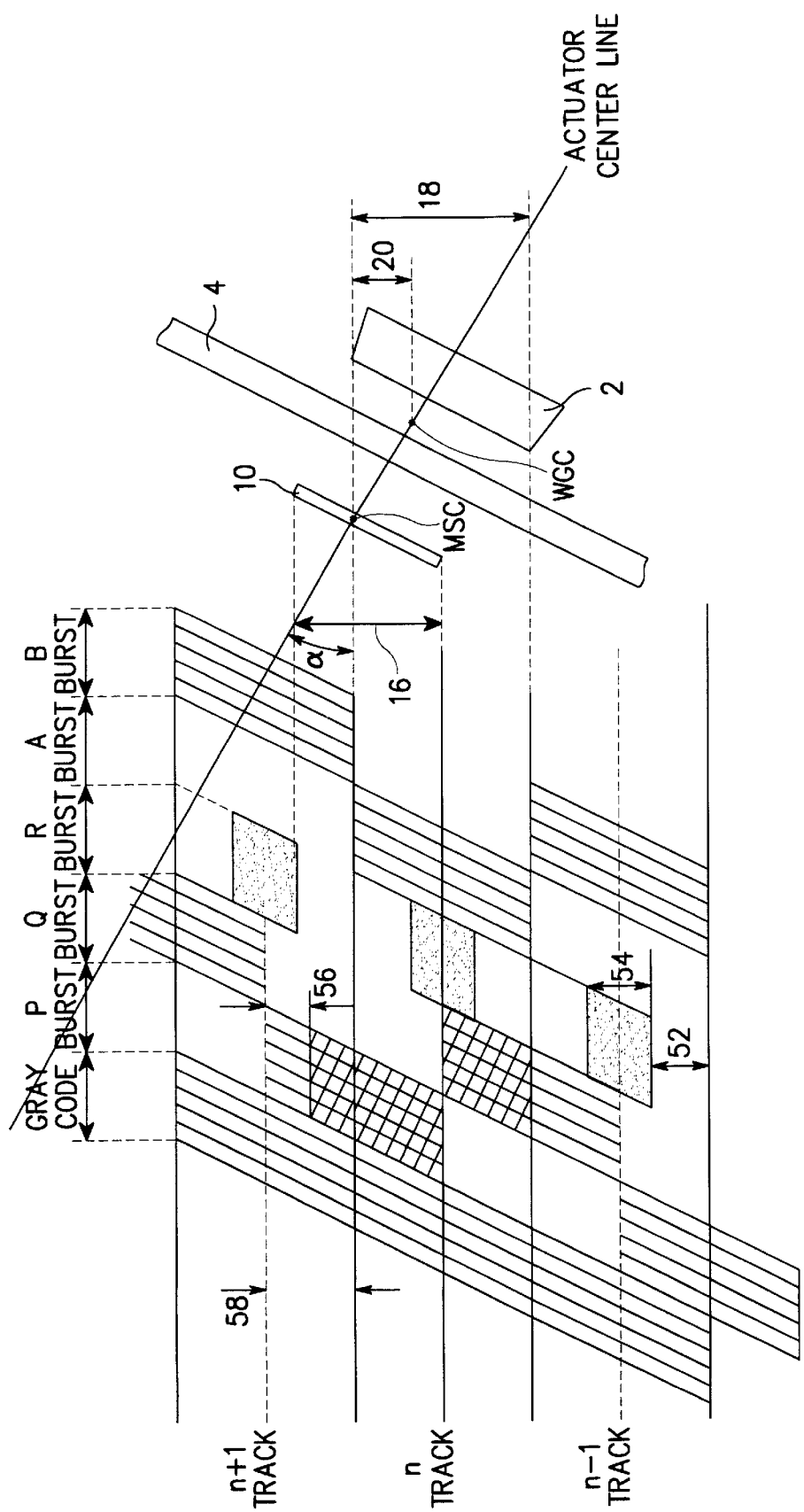
FIG. 7 is an explanatory diagram illustrating the servo burst write pattern recording five servo burst signals and the position of MR head when writing data to from the nth track according to an embodiment of the present invention.

FIG. 7 illustrates the servo burst write pattern, including five servo burst signals recorded, and the position of the MR head when writing data to the nth track according to an embodiment of the present invention. As described above with reference to FIG. 4, assuming that the displacement angle formed between the actuator center line and the disk traveling direction is defined as α, and that the distance between the MSC and the WGC of the MR head is defined as l, the quantity of the track shift is represented by l sin α. Accordingly, taking data reading into account when writing data, the MR head must be shifted in advance by l sin α. For this purpose, the microcontroller 34 places the MR head on track by means of the retrieved P, Q, R burst values.

In the following, the on-track control process of the MR head is described in detail. First, when bringing the valid write track width 18 of the MR head in line with the nth track width, the valid read track width 16 of the MR head exists on the n+1 track and nth track. At this time, the magnitude of the P burst signal retrieved through the MR sensor layer 10 represents a reduced value obtained by subtracting the value 56(l sin α) from the magnitude value recorded on n+1 track in half value 58, and the magnitude of the Q burst signal shows an increased value obtained by adding l sin α thereto. Accordingly, if twice the magnitude(l sin α) 54 of the R burst signal is added to the retrieved value of the P burst signal, the resulting amount equals the retrieved value of the Q burst signal so that the MR head is placed on track when reading data. The reason that the R burst signal on the nth track is different from the boundary of the n−1 track by the magnitude(l sin α) 52 is to prevent the R burst signal of the nth track from affecting adversely the on-track control of the MR head when the R burst signal writes data on the n−1 track.

As to another embodiment of the servo control according to the present invention, when the magnitude of the R burst signal is set to a value of 2l sin α, and when the sum of the magnitudes of the P, R burst signals equals the magnitude of the Q burst signal, the MR head can be controlled on-track. As to a further embodiment of the present invention, the data read/write operation can be performed in a manner opposite to that described above. That is, when writing data, only the retrieved values of the P, Q burst signals can be employed as is usual for the on-track control of the MR head; when reading data, the MR head can be controlled on track by using the additionally recorded R burst signal.

As described above, the present invention has the advantage that the MR head can be controlled on track by employing the additional R burst supplemented for compensation for the track shift resulting from the displacement angle of the MR head in any one of the data read and write modes, compensating for the track shift caused by the structural properties of the MR head.

The embodiments described above include many specific particulars to allow those skilled in the art to better understand the present invention, but in no way they must be construed as a limitation of the invention itself. Also it will be apparent that many changes and modifications may be made to the above embodiment without departing from the spirit of the present invention.

What is claimed is:

1. A servo control method for a magnetic storage device having a magneto resistive (MR) head which includes a plurality of tracks defining at least one center line of the tracks, comprising the steps of:

recording at least one burst signal used as identification information for control of said MR head;

recording an additional burst signal having a magnitude as large as a quantity of track shift caused by a displacement angle of the MR head around each said at least one center line of the tracks; and using said additional burst signal as position identification (ID) information for said MR head during servo control thereof.

2. A servo control method as defined in claim 1, wherein said at least one burst signal comprises first and second burst signals which are recorded in half value between adjacent tracks and are used as location ID information for the MR head, and wherein said additional burst signal is recorded after said first and second burst signals and is used to place the MR head on track during at least one of a read operation and a write operation.

3. A servo control method as defined in claim 2, wherein said additional burst signal is recorded at a point displaced from a boundary between tracks by the quantity of track shift caused by the displacement angle of said MR head.

4. A servo control method as defined in claim 2, wherein said additional burst signal is used during a read operation only.

5. A servo control method as defined in claim 2, wherein said additional burst signal is used during a write operation only.

6. A servo control as defined in claim 1, wherein said additional burst signal is recorded at a point displaced from a boundary between tracks by the quantity of track shift caused by the displacement angle of said MR head.

7. A servo control method for magnetic storage device having a magneto resistive (MR) head, comprising the steps of:
   recording first and second burst signals in half value between adjacent tracks of said magnetic storage device for use as position identification information for said MR head;
   recording an additional burst signal having a magnitude identical to an amount of track shift caused by a displacement angle of said MR head around a center line of each of said tracks;
   computing retrieved values of said first and second burst signals in one of a data read mode and a data write mode; and
   computing retrieved values of said first, second and additional burst signals in another one of said data read mode and said data write mode.

8. A servo control method as defined in claim 7, wherein said additional burst signal is used in the data read mode only.

9. A servo control method as defined in claim 7, wherein said additional burst signal is used in the data write mode only.

10. A servo control method as defined in claim 7, wherein, when the sum of twice the retrieved value of said third burst signal and the retrieved value of said first burst signal equals the retrieved value of said second burst signal, said sum is used for on-track control of said MR head.

11. A servo control method as defined in claim 10, wherein said third burst signal is recorded after said second burst signal.

12. A servo control method for a magnetic storage device having a magneto resistive (MR) head, comprising the steps of:
   recording first and second burst signals in half value between adjacent tracks for use as position ID information of said MR head;
   recording a third burst signal with a magnitude of twice a quantity of track shift caused by a displacement angle of said MR head around each center line of each of said tracks;
   controlling said MR head on track by computing retrieved values of said first, second and third burst signals in one of a data read mode and a data write mode; and
   controlling said MR head on track by computing retrieved values of said first and second burst signals in another of said data read mode and a said data write modes.

13. A servo control method as defined in claim 12, wherein said third burst signal is used in the data read mode only.

14. A servo control method as defined in claim 12, wherein said third burst signal is used in the data write mode only.

15. A servo control method as defined in claim 12, wherein, when the sum of the retrieved values of said first and third burst signal equals the retrieved value of said second burst signal, said sum is used for on-track control of said MR head.

16. A servo control method as defined in claim 15, wherein said first, second and third burst signals are recorded in consecutive order in a region for the on-track control of said MR head.

17. A servo control method for a magnetic storage device having a magneto resistive (MR) head which includes a plurality of tracks defining at least one center line of the tracks, comprising the steps of:
   recording at least one burst signal used as identification information for control of said MR head;
   recording an additional burst signal at a point displaced from a boundary between tracks by a quantity of track shift caused by a displacement angle of said MR head around each said at least one center line of the tracks; and
   using said additional burst signal as position identification (ID) information for said MR head during servo control thereof.

18. A servo control method as defined in claim 17, wherein said at least one burst signal comprises first and second burst signals which are recorded in half value between adjacent tracks and are used as location ID information for the MR head, and wherein said additional burst signal is recorded after said first and second burst signals and is used to place the MR head on track during at least one of a read operation and a write operation.

19. A servo control method as defined in claim 17, wherein said additional burst signal is used during a read operation only.

20. A servo control method as defined in claim 17, wherein said additional burst signal is used during a write operation only.

21. A servo control method for a magnetic storage device having a magneto resistive (MR) head, comprising the steps of:
   recording at least one burst signal used as position identification information for control of said MR head;
   recording an additional burst signal; and
   using said additional burst signal during a read operation only as position identification (ID) information for said MR head during servo control thereof.

22. A servo control method as defined in claim 21, wherein said at least one burst signal comprises first and second burst signals which are recorded in half value between adjacent tracks and are used as location ID information for the MR head, and wherein said additional burst signal is recorded after said first and second burst signals and is used to place the MR head on track during said read operation only.

23. A servo control method as defined in claim 21, wherein said additional burst signal is recorded at a point displaced from a boundary between tracks by the quantity of track shift caused by the displacement angle of said MR head.

* * * * *